United States Patent
Montrone et al.

(10) Patent No.: US 8,868,394 B2
(45) Date of Patent: Oct. 21, 2014

(54) METHOD FOR COMPUTER-AIDED SIMULATION OF OPERATING PARAMETERS OF A TECHNICAL SYSTEM

(75) Inventors: Francesco Montrone, Riemerling (DE); Robert Schulte, Longwood, FL (US); Wolfgang Streer, Orlando, FL (US); Ariane Sutor, Gräfelfing (DE)

(73) Assignee: Siemens Aktiengesellschaft, Munich (DE)

( * ) Notice: Subject to any disclaimer, the term of this patent is extended or adjusted under 35 U.S.C. 154(b) by 740 days.

(21) Appl. No.: 12/774,913

(22) Filed: May 6, 2010

(65) Prior Publication Data

US 2010/0287411 A1 Nov. 11, 2010

(30) Foreign Application Priority Data

May 11, 2009 (DE) .................. 10 2009 020 675

(51) Int. Cl.
*G06G 7/62* (2006.01)
*G06F 17/50* (2006.01)

(52) U.S. Cl.
CPC ........ *G06F 17/5009* (2013.01); *G06F 2217/10* (2013.01)
USPC .......................................................... 703/13

(58) Field of Classification Search
USPC .......................................................... 703/13
See application file for complete search history.

(56) References Cited

U.S. PATENT DOCUMENTS

| | | | |
|---|---|---|---|
| 6,834,256 B2 * | 12/2004 | House et al. ................. | 702/181 |
| 7,436,295 B2 * | 10/2008 | Collipi et al. ................ | 340/506 |
| 7,698,233 B1 * | 4/2010 | Edwards et al. .............. | 705/412 |
| 8,290,753 B2 * | 10/2012 | Tryon et al. ...................... | 703/2 |
| 2003/0074163 A1 * | 4/2003 | Anand et al. ...................... | 703/1 |
| 2004/0044499 A1 | 3/2004 | House et al. | |
| 2008/0086341 A1 | 4/2008 | Collipi et al. | |
| 2009/0271168 A1 * | 10/2009 | Minto et al. .................... | 703/17 |
| 2009/0271169 A1 * | 10/2009 | Minto et al. .................... | 703/18 |

FOREIGN PATENT DOCUMENTS

| | | |
|---|---|---|
| CN | 1238848 A | 12/1999 |
| CN | 1947121 A | 4/2007 |
| CN | 101188359 A | 5/2008 |
| DE | 19848094 A1 | 4/2000 |
| WO | WO 2008051317 A2 | 5/2008 |

OTHER PUBLICATIONS

Yong et al, "Estimation of travel time reliability in transportation networks with dependent link failures", China Civil Engineering Journal, vol. 41, No. 8, pp. 87-92, 2008, Aug. 31, 2008.
Xichan et al, "Function Parameter Tree Method of Complex Systems Reliability Modeling", Automatic Measurement and Control, vol. 25, No. 11, pp. 66-68, Dec. 31, 2006.

* cited by examiner

*Primary Examiner* — Dwin M Craig
*Assistant Examiner* — Juan Ochoa

(57) ABSTRACT

A method for computer-aided simulation of operating parameters of a technical system including a plurality of modules which each contain one or more components is provided. Failure events with associated downtimes for each component are simulated in a predetermined operating period using a first probability distribution for the moment of failure of the components and a second probability distribution for the length of the failure of the components, and a third probability distribution for a degree of reliability of the modules is determined. Based upon the probability distributions for the degrees of reliability of the modules, operating parameters of the technical system are simulated for the predetermined operating period. The method is used for any technical facilities, in particular for energy generation facilities.

19 Claims, 4 Drawing Sheets

METHOD FOR COMPUTER-AIDED SIMULATION OF OPERATING PARAMETERS OF A TECHNICAL SYSTEM

CROSS REFERENCE TO RELATED APPLICATIONS

This application claims priority of German Patent Application No. 10 2009 020 675.2 DE filed May 11, 2009, which is incorporated by reference herein in its entirety.

FIELD OF INVENTION

The invention relates to a method for computer-aided simulation of operating parameters of a technical system and to a corresponding computer program product.

BACKGROUND OF INVENTION

The economically efficient operation of a technical system essentially requires a high level of reliability, availability and maintainability of the technical system. Therefore, when designing new technical systems, it is already necessary when planning the system to perform computer-aided simulation of various configurations of said system, and to identify corresponding operating parameters depending on the reliability of the technical system. The prior art discloses approaches in which the expected value of the availability of a technical system is calculated with the aid of computers. Since the expected value is an average value, this approach does not consider in an appropriate manner the dynamic failure response of the technical system in relation to a corresponding operating period of the technical system.

SUMMARY OF INVENTION

An object of the invention is to simulate operating parameters of a technical system with the aid of a computer in such a way that the dynamic failure response of the system occurring in a predetermined operating period is taken into consideration.

This object is achieved by the method according to the independent claim. Developments of the invention are defined in the dependent claims.

In the method according to the invention, provision is made for simulating operating parameters of a technical system comprising a plurality of modules which in turn contain one or more components. The term "technical system" is interpreted in a broad sense here, and can include a technical facility as a whole or merely corresponding parts of a technical facility. According to the invention, failure events and associated downtimes for each component of a relevant module of the technical system are simulated within a predetermined operating period of the technical system in a step a), using a first probability distribution for the moment of failure of the relevant component and a second probability distribution for the length of the failure of the relevant component. A probability distribution for a degree of reliability (e.g. a percental reliability value) of the relevant module is then identified on this basis. The degree of reliability can be characterized e.g. by the portion of failure-free operating time of the relevant module within the operating period. The first and second probability distributions are predetermined in this case, e.g. empirically identified for the individual components that are to be installed in the technical system. In a step b) of the method according to the invention, operating parameters of the technical system are then simulated for the predetermined operating period on the basis of the probability distributions identified in step a) for the degrees of reliability of the relevant modules.

The method according to the invention is distinctive in that failures and downtimes are calculated using an event-discrete simulation for the relevant operating period and as a result of this the dynamic failure response of the technical system in the observed operating period is taken into consideration in an appropriate manner. It is thereby possible to obtain a realistic estimation of corresponding operating parameters, these depending on the reliability of the individual modules of the technical system. In this way, the economic efficiency of a technical system that is being designed can be assessed before it is constructed. Likewise, various configurations of technical systems can be simulated and compared with each other, in order thereby to calculate the configuration having the best parameters.

In a particularly preferred embodiment of the invention, a Monte Carlo simulation is utilized in step a) for the purpose of simulating the failure events and associated downtimes. In a further preferred embodiment, a Monte Carlo simulation is similarly used in step b) for the purpose of simulating the operating parameters on the basis of the probability distributions. Monte Carlo simulations are well known in the field of stochastics. In the context of these simulations, a multiplicity of random experiments are performed using corresponding probability distributions. The detailed description explains how corresponding Monte Carlo simulations can be used in both step a) and step b) of the method according to the invention.

In a particularly preferred embodiment of the method according to the invention, a multiplicity of simulation steps are performed in step a), wherein failure events with associated downtimes are simulated in each simulation step for all components of a relevant module within the predetermined operating period and, by combining the components of the relevant module via a fault tree, the degree of reliability of the relevant module is identified as a portion of failure-free operating time of the relevant module within the predetermined operating period, wherein the probability distribution for the degree of reliability of the relevant module is identified from the frequencies of the degrees of reliability that are calculated in the multiplicity of simulation steps. In this embodiment of the invention, the interaction of corresponding failures of individual components in a module is described by a predetermined error tree, which specifies the conditions whereby the failure of specific components results in the failure of the module concerned. In this case, the description of failures in technical systems by means of error trees is well known from the prior art and is therefore not explained further here.

In a further embodiment of the method according to the invention, the first probability distribution for the moment of failure of a relevant component of a relevant module is an exponential distribution. In this case, the density of the first probability distribution is preferably described as follows:

$$f(t) = \lambda e^{-\lambda t},$$

where t represents the moment of failure after activation of the relevant component or re-activation of the relevant component following a failure;
where $\lambda = 1/\text{MTBF}$, where MTBF is the average duration between two failures.

Similarly, in a further embodiment of the method according to the invention, the second probability distribution for the length of the failure of a relevant component of a relevant module is likewise an exponential distribution. In this case, the density of the second probability distribution is preferably as follows:

$$g(x) = \beta e^{-\beta x},$$

where x represents the length of a failure of the relevant component;
where $\beta = 1/MDT$, where MDT is the average duration of a failure of the relevant component.

Using exponential distribution, a realistic stochastic description of the failure response or the failure length of technical components is accomplished for many application scenarios.

In a preferred embodiment of the method according to the invention, the simulated operating parameters of the technical system comprise an overall degree of reliability of the technical system within the predetermined operating period, wherein this overall degree of reliability is calculated in step b) using the probability distributions for the degrees of reliability of the relevant modules previously calculated in step a), and by combining the modules via an error tree. In this case, the error tree describes the interaction of the failures at the level of the modules in the corresponding technical system. In the same way as the error tree which describes the interaction of the components in a relevant module, this error tree is known for the technical system that is to be simulated correspondingly. In this case, the overall degree of reliability is preferably again calculated on the basis of a Monte Carlo simulation, wherein provision is preferably made for identifying a multiplicity of overall degrees of reliability and the average value is generated therefrom.

In a further embodiment of the method according to the invention, the operating parameters of the technical system comprise the output values representing the performance of the technical system. The term "performance" has a broad significance in this case, and can cover e.g. the quantity of energy generated in an energy generating system or the quantity of products produced in a production system. The output values are preferably percental values in this case, and the technical system is dimensioned relative to a target performance of 100% in particular.

In a particularly preferred embodiment of the method according to the invention, an output value is predetermined for each combination of failed and non-failed modules of the technical system, wherein the division of time intervals of the occurrence of various output values within the predetermined operating period is identified in step b) on the basis of the probability distributions of the degrees of reliability of the relevant modules. It is thus possible to obtain a good overview of how long specific output values will be provided by the technical system in the corresponding operating period.

In a further variant of the method according to the invention, a multiplicity of simulation steps are performed in step b), wherein a division of time intervals of the occurrence of various output values within the predetermined operating period is simulated in each simulation step, and an average division over all simulated divisions is identified. When identifying the division of time intervals of the occurrence of various output values within the predetermined operating interval, consideration is preferably also given to planned maintenance intervals for the relevant modules of the technical system.

In a further embodiment of the method according to the invention, an averaged output value is identified over the predetermined operating period in each simulation step, and a distribution function is calculated from the frequencies of the averaged output values.

The method according to the invention can be used for any technical systems. In particular, the method according to the invention can be used to simulate the operating parameters of a technical system in the form of an energy generation facility or part of an energy generation facility, wherein the energy generation facility is in particular an IGCC facility (IGCC=Integrated Gasification Combined Cycle). Such facilities generate energy on the basis of prior fuel gasification. The operating parameters of this fuel gasification can be simulated for such IGCC facilities, for example.

In addition to the above described method, the invention further relates to a computer program product comprising program code stored on a machine-readable medium for implementing each variant of the method according to the invention when the program is executed on a computer.

BRIEF DESCRIPTION OF THE DRAWINGS

Exemplary embodiments of the invention are described in detail below with reference to the appended figures, in which.

DETAILED DESCRIPTION OF INVENTION

The method according to the invention can be used for simulating operating parameters of any technical systems: One particular application scenario is the simulation of operating parameters for an energy generation facility, in particular a so-called IGCC facility in which, by means of prior fuel gasification, a primary fuel is first converted into an energy-rich combustion gas that is then used for operating the corresponding energy generation facility.

Figure 1:
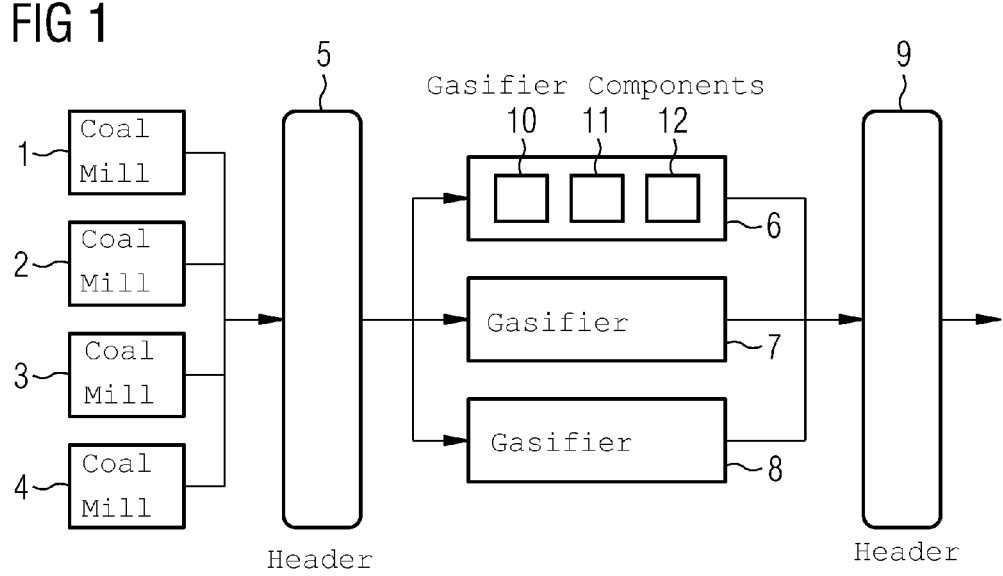
FIG. 1 shows a schematic illustration of part of a technical system in the form of an IGCC facility, prior coal gasification in the facility being depicted here.

FIG. 1 schematically shows the modules that are simulated in an embodiment of the invention, said modules relating to fuel gasification in the form of coal gasification in an IGCC facility. In this case, provision is made for four coal mills 1, 2, 3 and 4 that are connected in parallel and pulverize coal into coal dust, this being then supplied via a so-called header 5 to corresponding gasifiers 6, 7 and 8 which, from coal dust, generate the combustion gas that is used in the facility. The combustion gas from the individual gasifiers is combined again via a corresponding header 9 and is then supplied to the actual combustion from there. As an operating parameter, it is possible inventively to simulate e.g. the output value of the coal gasification in the form of the generated quantity of combustion gas. In this case, the output value is specified as a percental value of the combustion gas that is currently being generated relative to a target quantity of 100% combustion gas. The output value is also referred to as equivalent output in the following. In this case, the coal gasification is configured in such a way that an equivalent output of 100% is achieved when operating with three coal mills and three gasifiers. By virtue of using four coal mills, the system has been redundantly configured to the effect that, even in the event of a failure or planned maintenance of a coal mill, an output value of 100% is still present. This does not apply in the event of maintenance or failure of a gasifier.

In the scenario as per FIG. 1, each of the individual modules 1 to 9 comprises further components, whose operation in turn influences the operation of the overall module. In this case, for example, corresponding components 10, 11 and 12 are schematically indicated for the gasifier 6. In this case, specific combinations of failures of the individual components result in the failure of the overall module. Corresponding error trees exist for the modules and describe when a combination of predefined component failures also results in a failure of the module. In this case, the composition of the individual modules and their components are known beforehand, representing a corresponding configuration of the technical system. In particular, for each component of a relevant module, a probability distribution is specified for the moment of failure of the corresponding component after activation or after re-activation following a failure. Furthermore, for each component of a relevant module, a probability distribution is specified for the length of the failure of the relevant component. The corresponding probability distributions are calculated e.g. empirically (based on live operation of the relevant component, for example).

Figure 2:
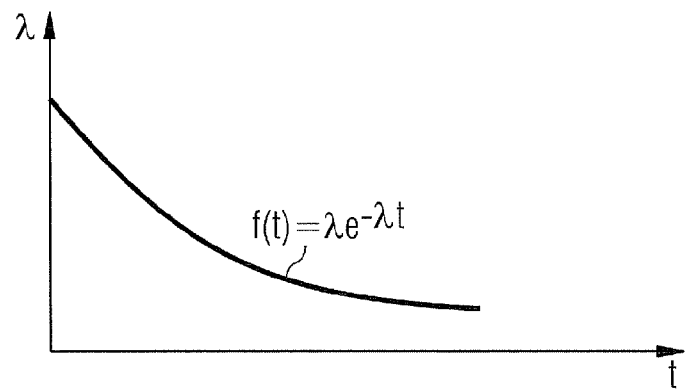
FIG. 2 shows a diagram of an example of a probability density, which is used in an embodiment of the invention, of a component of a module of a technical system.
Figure 3:
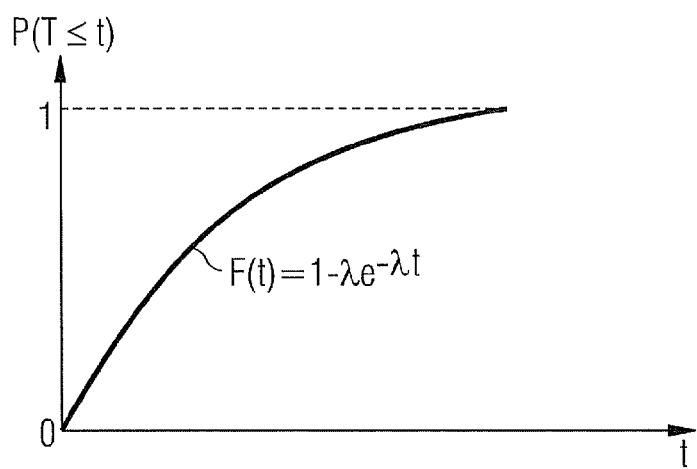
FIG. 3 shows a diagram of the distribution function resulting from the probability density as per FIG. 2.

FIG. 2 shows, in the form of an exponential distribution, an example of a density function f(t) of a probability distribution for the moment of failure t of a component of a technical system that is to be simulated. In this case, the parameter $\lambda$ represents the reciprocal value of the average duration between two failures MTBF (MTBF=Mean Time Between Failure) of the component. In this case, this value is known for each component of the relevant module of the technical system. In a similar manner to the moment of failure, the duration of failure can also be described in the form of the exponential distribution as per FIG. 2. In this case, the parameter t then represents the length of the failure of a component and $\lambda$ is the reciprocal value of the average duration of a failure MDT (MDT=Mean Down Time), wherein this duration is likewise known for each component. The corresponding distribution function F(t) shown in FIG. 3 is derived by integration from the probability density as per FIG. 2. In this case, in respect of a moment t, the distribution function specifies the probability $P(T \leq t)$ that the event of a failure occurred at a moment T which is less than or equal to the moment t. If f(t) represents the density function for the length of a failure, F(t) describes the probability that the length of a failure is less than or equal to t.

In the embodiment described here of the method according to the invention, in respect of a predetermined operating period or forecast period of the corresponding technical system (e.g. one year), the effective equivalent outputs within the period are now calculated on the basis of an event-discrete simulation. In this case, using a Monte Carlo simulation, a probability distribution for the reliability of the relevant module is initially identified for each individual module of the technical system. This involves initially observing each individual component of a relevant module and going through the predetermined operating period on the basis of a Monte Carlo simulation. The distribution function as per FIG. 3 is used in this case.

In the context of the Monte Carlo simulation, probability values between 0 and 1 are randomly generated, wherein for a randomly generated probability value on the y-axis, the distribution function as per FIG. 3 is then used to calculate the moment t on the x-axis corresponding to the randomly generated probability value, said moment t then representing a moment of failure. Using a corresponding distribution function for the duration of failure, the length of the failure is then identified by again randomly generating values between 0 and 1 and calculating a corresponding duration by means of the distribution function. Finally, a new moment of failure and a corresponding failure length are randomly generated again. This is repeated until all of the observed operating period has been completed.

In this case, the simulation described above is performed for each component of a relevant module of the technical system. A diagram is therefore obtained for each component, describing when a component functions or has failed within the operating period. The diagrams of all components are then combined using the error tree, in order to calculate when the whole module has failed within the operating period. For example, if only the failure of all components results in the failure of the corresponding module in this case, a diagram will be produced in which, within the operating period, a corresponding failure of the module will only be present in the time periods during which all components have failed.

The simulation of the downtimes of a relevant module within an operating period is therefore produced as a result of the above-described simulations. In this case, that portion of the time in which the relevant module has not failed represents a corresponding reliability of the relevant module. The above-described simulations are repeated many times, i.e. a multiplicity of simulated reliability values for the relevant module are obtained thereby. From this multiplicity of reliability values, it is then possible to calculate a frequency distribution and hence a corresponding probability distribution of the reliabilities.

Figure 4:
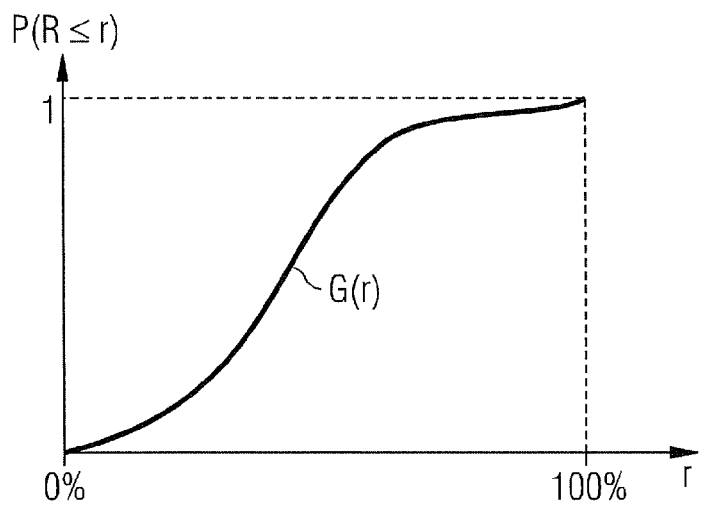
FIG. 4 shows a diagram of an example of a distribution function for the reliability of a module of a technical system, said distribution function being generated using an embodiment of the invention.

By way of example, FIG. 4 shows a calculated course of a corresponding distribution function G(t) of the probability distribution of the reliabilities of a module. The reliability value r, which lies between 0% for a complete failure of the relevant module within the operating period and 100% for zero failure of the module in the operating period, is indicated along the x-axis in this case. Along the Y-axis is plotted the probability that an observed reliability R is less than or equal to a corresponding reliability value r along the x-axis.

In a variant of the method according to the invention, an overall reliability of the technical system for the observed operating period can be calculated on the basis of the calculated distribution functions for each module of a technical system. A corresponding error tree between the individual modules is again known in this case, and describes how the failures of the individual modules can result in a total failure of the technical system. Monte Carlo simulations based on the relevant distribution functions of the modules are again carried out for the purpose of calculating the overall reliability. This means that a probability value between 0 and 1 is randomly determined again and a reliability value is identified on the basis of the corresponding distribution function of a module (e.g. the function as per FIG. 4). This is performed for each module. On the basis of these reliability values, which can also be interpreted as probabilities for the correct functioning of the module during the operating period, it is then possible to identify an overall reliability of the technical system with the aid of the error tree. A multiplicity of simulations are performed in this case, wherein each simulation results in an overall reliability of the technical system. The reliability value which is averaged over all simulated overall reliabilities, for example, is then identified as an operating parameter.

Additionally or alternatively to this overall reliability, in a further variant of the inventive method, the division of correspondingly occurring equivalent outputs of the technical system can be identified over the operating period. In this case, corresponding equivalent outputs are predetermined for all combinations of failed and non-failed modules of the technical system. Again using Monte Carlo simulations of the reliability values based on the probability distribution of the reliabilities of the individual modules, it is thus possible to simulate how the various equivalent outputs of the overall technical system are divided relative to an operating period.

Concerning a technical system in which a failure of two modules results in an equivalent output 50%, for example, the following scenario is produced: if a reliability value of 80% reliability is calculated for one module and 90% for the other module using Monte Carlo simulation based on the distribution of the reliabilities of the relevant module, an equivalent output of 50% is produced for a portion of (100%−80%)×(100%−90%)=2% of the total operating period. Corresponding output values are also specified in an appropriate manner for other combinations of failed and/or non-failed modules, thereby producing an overall diagram in which the resulting equivalent output is shown for corresponding sections of the operating period.

Figure 5:
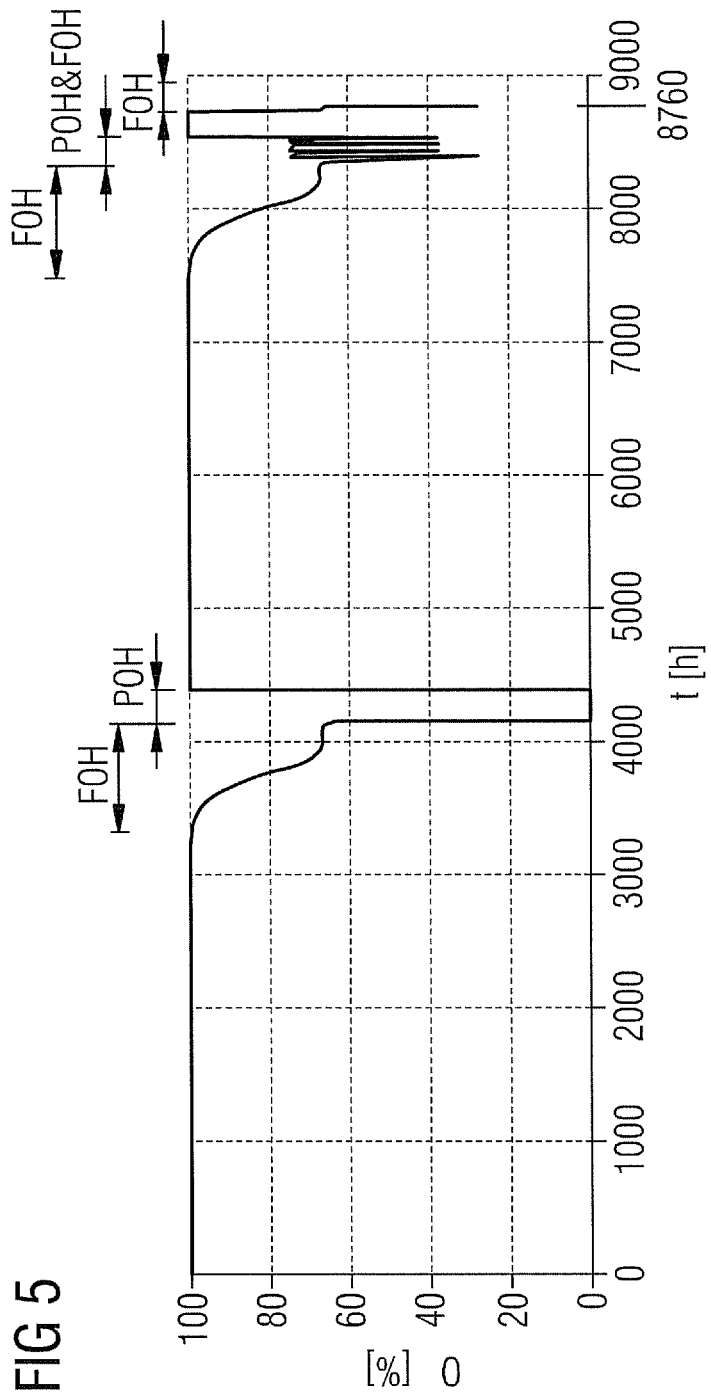
FIG. 5 shows a diagram of the division of the output values of a technical system within an operating period, said division being simulated using an embodiment of the invention.

By way of example, FIG. 5 shows a diagram which has been calculated using an embodiment of the invention and in which the equivalent output O of a technical system, which has been identified over a plurality of simulations and averaged over said simulations, is shown as a percentage within an operating period of one year (=8760 hours). In addition to the unplanned failures, whose time periods are indicated as FOH (FOH=Forced Outage Hours) in FIG. 5, consideration is additionally given here to planned maintenance work, which is designated as POH (POH=Planned Outage Hours) in FIG. 5. In this case, the sections of planned maintenance are marked in those time sections in which the maintenance is carried out. Otherwise, the equivalent output is arranged in descending order of the calculated output values from left to right. It can be seen that a planned maintenance is performed after approximately 4200 operating hours of the technical system, during which not all modules are in operation, resulting in an equivalent output of 0. Furthermore, planned maintenance activities take place after approximately 8600 operating hours, during which only individual modules are maintained. At these moments, new configurations of the technical system then exist with correspondingly non-operational modules, wherein the inventive method can be used again for said configurations in order to identify suitable failures during these planned maintenance periods, such that the planned maintenance activities are combined with failures.

It is also clearly evident from FIG. 5 that the distribution of the equivalent outputs can be suitably identified over an observed operating period of a technical system using the method according to the invention. In this way, various configurations of the technical system can be evaluated and compared during design with regard to reliability and/or the anticipated equivalent output, whereby the economic efficiency of a corresponding technical facility can be suitably assessed before it is constructed. In this case, the operating parameters are always calculated for a predefined duration of operation, wherein in particular even planned maintenance models that are performed during the duration of operation can be taken into consideration.

Figure 6:
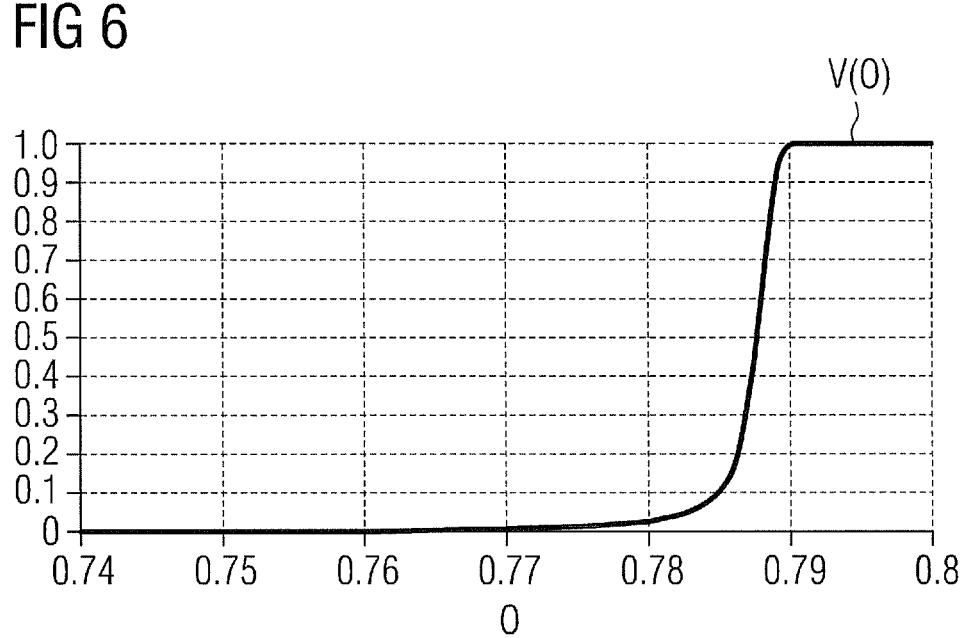
FIG. 6 shows a diagram of the distribution function of the output values of a technical system, said distribution function being simulated using an embodiment of the invention.

FIG. 6 shows a further diagram which, using a variant of the invention, can be generated from the correspondingly simulated divisions of the equivalent outputs over the operating period. In this case, the output averaged over the operating period is identified for each simulation of the division of the equivalent outputs over the operating period. A density function and hence the corresponding distribution function can be calculated from the frequencies of the averaged outputs, an example of such a function being shown in FIG. 6. The distribution function is designated as V(0) in this case, and represents the probability that the equivalent output of the technical system is less than or equal to a corresponding value 0 on the x-axis. In this case, the equivalent outputs are scaled to values between 0 (corresponding to 0%) and 1 (corresponding to 100%). Only an extract of the outputs from 0.74 to 0.8 is depicted in FIG. 6, because the increase in probability from 0 to 1 occurs in precisely this region.

The invention claimed is:

1. A method for computer-aided simulation of operating parameters of a technical system, the technical system comprising a plurality of modules which each contain one or more components, the method comprising:
    simulating operating parameters of the technical system, for the technical system being a fuel gasification of an Integrated Gasification Combined Cycle (IGCC) facility, for a predetermined operating period by simulating failure events and associated downtimes for each component of a module within the predetermined operating period using
        a first probability distribution for a moment of failure of each component, and
        a second probability distribution for a length of the failure of each component;
    wherein a third probability distribution for a degree of reliability of each module is determined based upon the first and second probability distributions; and
    wherein the simulating of the operating parameters of the technical system for the predetermined operating period is based upon the third probability distribution for the degree of reliability of each module.

2. The method as claimed in claim 1, wherein a Monte Carlo simulation is utilized for simulating the failure events and associated downtimes.

3. The method as claimed in claim 1, wherein a Monte Carlo simulation is used for simulating the operating parameters.

4. The method as claimed in claim 1,
    wherein a plurality of simulations of failure events and associated downtimes are performed,
    wherein failure events and associated downtimes are simulated in each simulation for all components of a module within the predetermined operating period,
    wherein the degree of reliability of the module is determined as a portion of failure-free operating time of the module within the predetermined operating period by combining the components of the module via a fault tree, and
    wherein the third probability distribution for the degree of reliability of the module is determined from frequencies of the degree of reliability calculated based upon the plurality of simulations.

5. The method as claimed in claim 1, wherein the first probability distribution for the moment of failure of a component of a module is an exponential distribution.

6. The method as claimed in claim 5, wherein a density of the first probability distribution is as follows:

$$f(t)=\lambda e^{-\lambda t},$$

wherein t represents the moment of failure after activation of the component or re-activation of the component following a failure; and wherein $\lambda=1/\text{MTBF}$, MTBF (Mean Time Between Failure) being an average duration between two failures of the component.

7. The method as claimed in claim 1, wherein the second probability distribution for the length of the failure of a component of a module is an exponential distribution.

8. The method as claimed in claim 7, wherein a density of the second probability distribution is as follows:

$$g(x)=\beta e^{-\beta x},$$

wherein x represents the length of a failure of the component; and wherein $\beta=1/\text{MDT}$, MDT (Mean Down Time) being the average duration of a failure of the component.

9. The method as claimed in claim 1,
wherein the operating parameters of the technical system comprise an overall degree of reliability of the technical system within the predetermined operating period,
wherein the overall degree of reliability is calculated based upon the third probability distributions for the degrees of reliability of the modules and by combining the modules via an error tree.

10. The method as claimed in claim 1, wherein the operating parameters of the technical system comprise output values representing a performance of the technical system.

11. The method as claimed in claim 10, wherein the output values are percental values and the technical system is dimensioned relative to a target performance of 100%.

12. The method as claimed in claim 10, wherein the output values describe a quantity of one or more products produced in the technical system.

13. The method as claimed in claim 10, wherein the output values describe a quantity of energy produced by the technical system.

14. The method as claimed in claim 10,
wherein an output value is predetermined for each combination of failed and non-failed modules of the technical system,
wherein a division of time intervals of an occurrence of various output values within the predetermined operating period is determined based upon the third probability distributions for the degrees of reliability of the modules.

15. The method as claimed in claim 14,
wherein a plurality of simulations of operating parameters of the technical system for the predetermined operating period based upon the third probability distributions for the degrees of reliability of the modules are performed,
wherein a division of time intervals of the occurrence of various output values within the predetermined operating period is simulated in each simulation, and
wherein an average distribution over all simulated divisions is identified.

16. The method as claimed in claim 14, wherein, when determining the division of time intervals of the occurrence of various output values within the predetermined operating period, planned maintenance intervals for the modules of the technical system are also considered.

17. The method as claimed in claim 15,
wherein an averaged output value is determined over the predetermined operating period in each simulation, and
wherein a distribution function is calculated based upon frequencies of the averaged output values.

18. The method as claimed in claim 1, wherein the operating parameters are simulated for a technical system being an energy generation facility or part of an energy generation facility, the energy generation facility being an IGCC facility.

19. A non-transitory computer readable medium storing computer executable instructions which, when executed by a processor, perform a method for simulation of operating parameters of a technical system, the technical system comprising a plurality of modules which each contain one or more components, the method comprising:
simulating operating parameters of a technical system for a rechnical system being a fiel gasification of an Integrated Gasification Combined Cycle (IGCC) facility, for a predetermined operating period by simulating failure events and associated downtimes for each component of a module within the predetermined operating period using
a first probability distribution for a moment of failure of each component, and
a second probability distribution for a length of the failure of each component;
wherein a third probability distribution for a degree of reliability of each module is determined based upon the first and second probability distributions; and
wherein the simulating of the operating parameters of the technical system for the predetermined operating period is based upon the third probability distribution for the degree of reliability of each module.

* * * * *